United States Patent [19]

Hoelscher

[11] 4,170,630
[45] Oct. 9, 1979

[54] METHOD FOR PRODUCING PARTICULATE SOLIDS IN A TURBULENT WAKE BURNER

[75] Inventor: Harold E. Hoelscher, Pittsburgh, Pa.

[73] Assignee: American Cyanamid Company, Stamford, Conn.

[21] Appl. No.: 479,075

[22] Filed: Jun. 13, 1974

Related U.S. Application Data

[63] Continuation of Ser. No. 873,072, Oct. 31, 1969, abandoned.

[51] Int. Cl.² .................. C01B 21/06; C01B 13/14
[52] U.S. Cl. ........................... 423/409; 423/592; 423/613; 423/659
[58] Field of Search ............... 423/659, 613, 592, 409

[56] References Cited

U.S. PATENT DOCUMENTS

| | | | |
|---|---|---|---|
| 2,487,474 | 11/1949 | Porter | 423/409 |
| 2,937,928 | 5/1960 | Hughes et al. | 423/613 |

OTHER PUBLICATIONS

A. I. Ch. E. Journal, vol. 11, Nov. 1965, pp. 1058–1063, Article "Chemical Reaction in the Turbulent Wake of a Cylinder" by G. M. Saidel et al.

"Essentials of Fluid Dynamics" by L. Prandtl, pp. 180–186, 1952, Hafner Pub. Co., New York.

Primary Examiner—Herbert T. Carter
Attorney, Agent, or Firm—William J. van Loo

[57] ABSTRACT

This invention relates to a process and apparatus for producing particulate solids from vaporous reactants in a reactor wherein the reactor zone is remote from the feed inlets to the reactor.

7 Claims, 3 Drawing Figures

METHOD FOR PRODUCING PARTICULATE SOLIDS IN A TURBULENT WAKE BURNER

This is a continuation, of application Ser. No. 873,072 filed Oct. 31, 1969 and now abandoned.

This invention relates to a process and apparatus for producing particulate solids including refractory oxides. More particularly, the present invention relates to a process and apparatus for producing particulate solids including refractory oxides from vaporous reactants in a reactor wherein the reactor zone is remote from the feed inlets to the reactor.

A wide variety of apparatus and processes have been used to react a gas and a vaporous metal salt especially to produce refractory oxides. In these processes, a metal or a metal salt, usually the chloride, is contacted with an oxygen containing stream at elevated temperatures to effect oxidation thereof. These processes suffer disadvantages which have restricted their use on a commercial basis. A major disadvantage common in many processes is that during reaction, product build-up occurs at the reactant inlets and eventually blocks the inlet to reduce or stop reactant flow. This necessitates downtime to clean the apparatus and obviously is to be avoided. It is believed that one of the prime causes for the build-up of product at the reactant inlets is that reaction is catalyzed by the solid surfaces of the inlet and adjacent surfaces of the reactor interior.

It has been proposed to premix the reactants and thereafter introduce the mixture into the reaction zone under conditions of laminar flow as described in U.S. Pat. No. 3,121,641.

Temperatures at or near the reactant inlets are maintained below that which will support reaction. To minimize the probability of solid build-up at the inlet, temperature conditions sufficiently high to support reaction are maintained downstream of the reactant inlets. However, this method of operation has proved to be unsatisfactory because of "back-flashing" of the reaction upstream to the reactant inlets which results in the eventual build-up of solid product at the inlets. It has also been proposed to maintain the reactor inlets at relatively low temperatures to minimize reaction thereon but this has not proved satisfactory since solids build-up still occurs.

It has also been proposed to react an oxygen containing gas and a metal or a metal salt under conditions to effect a highly turbulent stream comprised of a mixture of the reactants and products. However, reaction still occurs on the solid surfaces of the reactor including the feed inlets and causes undesirable solids build-up. Additionally, a wide variety of reactor configurations, including "Y" shaped reactors, have been proposed to reduce solid build-up at the reactant inlets but without significant success. Accordingly, there is a present need for effectively reacting a vaporous metal or a metal salt with a reactant gas such as oxygen to form particulate solids including metal oxides in such a manner as to prevent solids build-up in the reaction zone.

It is an object of the present invention to provide a new process and apparatus for producing particulate solids by high temperature vapor phase reactions conducted in a manner which allows for continuous operation over prolonged periods. It is a further object of the present invention to provide a process and apparatus for producing particulate solids wherein unwanted build-up of solids in the reactor is minimized. It is another object of this invention to provide means for reacting materials which are vaporous at reactor inlet temperatures and give at least one product which is solid at reactor outlet temperatures in a manner which reduces the tendency of the solids to deposit on the walls of said reactor. Further objects of the present invention will become evident in view of the following detailed description thereof.

In accordance with the present invention these objects are accomplished in a relatively simple manner by contacting the reactants under certain conditions which assure that little, if any, solid product deposits in or around the reactant inlets. The inlets thus remain unplugged even after lengthy periods of continuous operation advantageously avoiding the need for frequent and non-productive reactor cleanout.

For the purposes of description reference will be made to "primary reactants" and "secondary reactants". These terms are not intended to denote importance of the reactants, but are rather intended to indicate the relative positions in the reactor where the respective reactants are introduced. The "primary reactant" is introduced through a relatively upstream part and the "secondary reactant" through a relatively downstream part, in the reactor. Though the present invention contemplates reaction of more than two materials, for simplicity the following description refers to only one primary reactant and one secondary reactant. As will be seen, it is an easy matter to introduce three or more reactants into the reactor provided by the present invention.

A primary reactant is introduced into a reactor through an upstream inlet. One or more secondary reactants are introduced into the reactor interior in the same direction of flow as the primary reactant at a downstream point in the reactor. The conduits which are employed for the introduction of the secondary reactant extend through all or a portion of the reactor width, and each has a part facing generally downstream. The secondary conduits, in being located in the path of the primary reactant stream, disturb the flow of the primary reactant and a wake is formed around each secondary inlet. The wake is stabilized by regulating the flow rates of the primary and secondary reactants. Turbulent mixing of the reactants and, therefore, reaction begins at a downstream point which is remote from all reactant inlets. The product is removed from the reactor and recovered as a particulate solid.

The flow rate of each reactant and the geometry and position of each secondary reactant inlet are controlled so that a stable wake is formed and the beginning of the zone wherein the reactants are mixed is sufficiently downstream from each secondary inlet so as to prevent possible backflash of the reaction to the reactant inlets. The flow rate of the primary reactant is maintained as stable and constant as possible to prevent pulsating flow thereof. Furthermore, the flow rate of the primary reactant is maintained so that the velocity profile across the reactor width is maintained as flat as possible, i.e. the velocity in the direction of flow is essentially uniform throughout the cross-section of the reactor. By regulating the flow rate of the primary reactant in this manner, a stable wake of desired size is established downstream of each secondary reactant inlet and it is possible to prevent reaction and solids build-up at or near the inlets. The size of the wake is not only determined by the flow pattern of the primary reactant but also by the pressure drop across the secondary reactant inlet. The size of the wake is proportional to the secondary reactant flow rate and the length of the secondary reactant conduit perpendicular to the direction of primary reactant flow. An excessive pressure drop at the secondary reactant inlet for any given velocity of the primary reactant will result in induction of the primary reactant into the wake, thereby disrupting it. The pressure drop of the secondary reactant stream should be maintained sufficiently large to cause the beginning of the reaction zone to be displaced at least one secondary conduit diameter downstream of the secondary inlet. Thus, flow rates of the primary and secondary reactants are regulated to maintain a stable wake of desirable size without causing premature entrainment of the primary reactant therein.

The stability of the wake will be influenced by the shape of the secondary reactant inlet. To maximize wake stability, the secondary reactant inlet should be introduced through a slot in the secondary reactant conduit, the walls of the slot being in a plane essentially parallel to the direction of primary reactant flow. By using such an inlet, the secondary reactant issues into the reactor in a direction which is essentially parallel to the flow of the primary reactant thereby avoiding excessive turbulence which could induce premature mixing. Other inlet configurations such as perforations or nozzles along the length of the secondary conduit can be successfully employed.

There can be provided a plurality of secondary reactant conduits extending into the reactor and transverse to the direction of flow of the primary reactant. When more than one secondary reactant conduits are employed, all of the secondary conduits should be located so that none is in the wake or reaction zone of another secondary reactant inlet. So long as this condition is met, it is not necessary that all the secondary conduits be equidistant from the primary reactant inlet.

The flow pattern of the primary reactant around the secondary conduit is influenced by the shape, size and location of the secondary reactant conduit. Any of a wide variety of cross-sectional shapes can be employed including circular and elliptical tubes. It is preferred to construct the secondary conduit with a circular cross-section since the desired flow patterns are more easily obtained. The secondary conduit should be of a size and in a position such that substantial flow between the reactor walls and the outer walls of the secondary conduits is permitted.

The operation of the present invention requires adjustment of reactant flow rates to prevent flashback of the reaction to the secondary reactant inlet. Flashback will occur if the reaction is propagated with greater velocity than the velocity of the reactant stream. For example, in the case of metal oxide production, the primary reactant should have inertial forces which are at least fifty times higher than the viscous force of the reactant stream, i.e., it should have a Reynolds Number of at least 50 (based upon the diameter of the secondary reactant conduit). Generally, if the Reynolds Number is 50-500, and preferably 100-300, based upon each secondary conduit, flashback will be avoided in the case of metal oxide formation. When the gas velocity in the wake is higher than the intrinsic velocity of the reaction the "flame" will move downstream to a point where the velocity of the reactant mixture is reduced as a result of expansion of secondary reactant stream. The "flame" then will be located at the point where the intrinsic velocity of the reaction and the velocity of the gaseous stream are equal. Since the intrinsic velocities of reactions can be determined by well-known techniques, it is a simple matter to find which flow rates to use for conducting reactions in accordance with this invention. After the reaction has occurred, the reaction mixture flows from the reaction zone and the product is recovered.

In a preferred embodiment, proportionately large amounts of primary reactant, in excess of that needed to fully react with the secondary reactant are employed. The probability of reaction occurring on the reactor walls is thereby minimized since the flow of the primary reactant provides a barrier which surrounds and confines the zone wherein reaction occurs and solids form. The interior surface of the reactor is thus kept generally out of contact with the reaction product.

The process and apparatus of the present invention can be employed to conduct a wide variety of reactions, especially those leading to solid products. Thus metals or metal salts can be reacted with oxygen, water vapor, or ammonia to give oxides or nitrides, respectively. When it is desired to produce white oxides, among the suitable metals or salts which can be employed are zinc, aluminum, titanium, thorium, antimony, tantalum, zirconium, tin, barium, boron, or silicon chlorides, oxychlorides, carbonyls or the like. Such products can be used in ordinary pigment applications. The present process and apparatus are also useful for conducting organic reactions which employ gaseous reactants and produce products which are solid at reaction temperatures. Thus, for example, the present invention can be employed to produce carbon black by the incomplete combustion of natural gases.

Reaction conditions such as temperatures and proportions which should be employed for specific reactions are well known and do not constitute a part of the present invention. Thus, it is known that the reaction temperature employed to produce oxides depends upon the metal or metal salt reactant employed. Suitable temperatures are generally within the range of 400° C. to about 2500° C. and preferably from about 500° C. to about 1500° C. Reaction occurs within a period of about 0.0001 and about 1 second after the metal or salt is brought into contact with oxygen.

The amount of oxygen-containing gas will, in the first instance, depend upon the stoichiometry of the reaction with the metal or metal salts to be converted. For practical results, at least a stoichiometric amount based upon the metal or salt compound to be oxidized should be used. It is normally desirable to have an excess of oxygen available for the reaction in order to insure complete reaction and to minimize the possibility of reaction occurring at or near the reactor walls. This excess can, without practical inconvenience, be as high as 100% by volume or even higher. More usually, a 50% by volume excess of oxygen is employed with good results. The amount of excess has an effect on particle size, with a higher proportion of oxygen producing a product having a smaller particle size, but part or all of excess oxygen can be replaced with an inert gas such as nitrogen or carbon dioxide.

It is within the scope of the present invention to co-react many materials. Thus, in forming titanium dioxide, small amounts, usually up to about 10% by weight, of aluminum trichloride, antimony trichloride, phosphorus tri and -pentachloride, and/or silicon tetrachloride can be employed to modify the crystalline characteristics of the oxide product. The gaseous reactants may also contain small amounts of water, hydrogen, nitrogen oxides and combustible hydrogen-containing organic vapors, for example, hydrocarbons, alcohols, ketones, esters and ethers as nucleation promoters.

The invention will be described below with reference to accompanying drawings.

Figure 1:
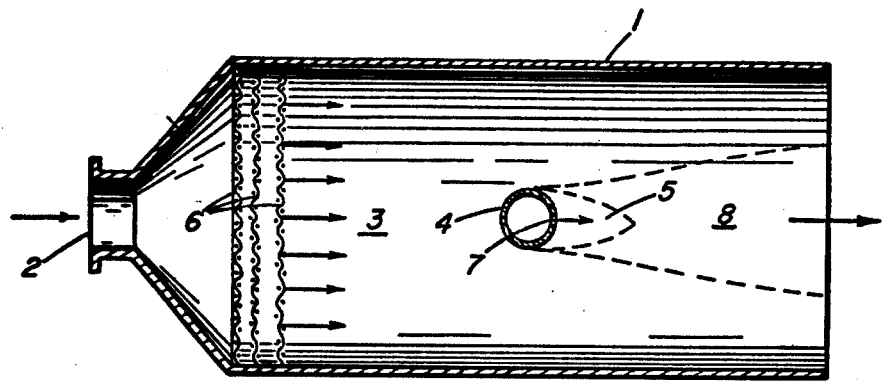
FIG. 1 is a cross-sectional side view of a reactor having one secondary reactant inlet.
Figure 2:
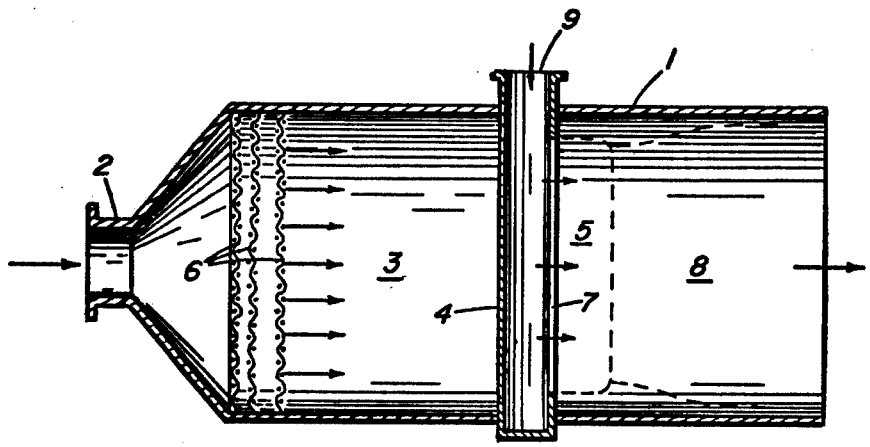
FIG. 2 is a cross-sectional top view of the apparatus of FIG. 1.

The primary reactant is that reactant which is introduced into the reactor through the primary reactant inlet. Referring now to FIGS. 1 and 2, the primary reactant is introduced into the reactor 1 through primary reactant inlet 2 into the upstream section 3 of the reactor 1. The flow rate of the primary reactant around secondary conduit 4 is sufficiently high and the velocity thereof in a downstream direction is relatively constant so as to form a wake 5 in which essentially no reaction occurs. Screens 6 can optionally be employed in order to facilitate obtaining a constant velocity profile across the width of the reactor 1. A secondary reactant is introduced through nozzle 9 of the secondary reactant conduit 4. The secondary reactant exits the conduit 4 through inlet 7 into the wake 5. The primary and secondary reactants mix in reaction zone 8 outside of the wake 5 and downstream of the conduit 4 under conditions of turbulent flow to effect reaction of the metal or metal salt to produce the solid particulate product. The product and unreacted primary reactant exit the reactor 1 and are recovered.

Figure 3:
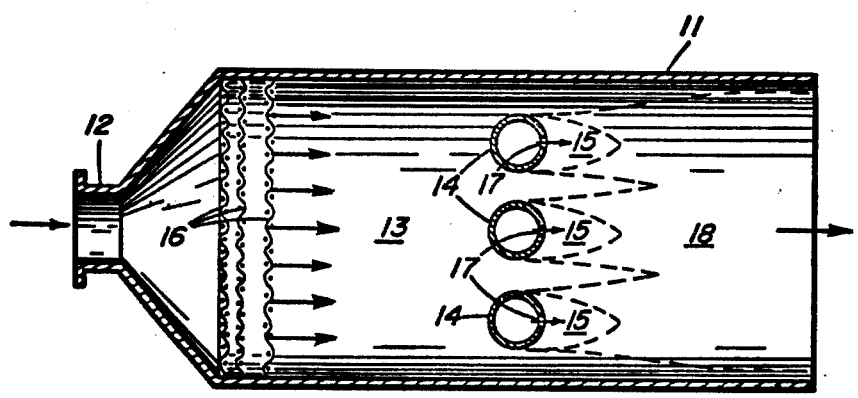
FIG. 3 is a cross-sectional view of a reactor having three secondary reactant inlets.

Referring now to FIG. 3, the primary reactant is introduced through nozzle 12 and optional screens 16 into zone 13 of the reactor 11. Secondary reactants are introduced into the reactor 11 through secondary reactant conduits 14 which exit by means of slits 17 throughout most of the width of reactor 11 in the same manner as shown in FIG. 2. The primary reactant forms wakes 15, downstream of conduits 14, wherein essentially no reaction occurs. The primary and secondary reactants are then mixed under turbulent flow in reaction zone 18 maintained at an elevated temperature to effect reaction. The particulate product and unreacted primary reactant are removed from the reactor 11 and recovered.

To better understand the invention, it is essential that the reaction occurs remote from the secondary reactant inlets. For the purpose of this invention, remote implies a distance downstream from said reactant inlets such that solid products formed by the reaction will not deposit thereon.

I claim:

1. A process for reacting gaseous materials to produce a particulate solid product which comprises introducing a primary reactant into a reactor having a primary reactant inlet and at least one tubular secondary reactant conduit traversing the path of said primary reactant through said reactor, said tubular conduit being of such size and position that substantial flow of primary reactant therearound within said reactor is permitted, said introducing being with sufficient velocity to establish a primary reactant stream with a Reynolds Number of at least 50 based upon the diameter of each said secondary reactant conduit, introducing a secondary reactant through said secondary reactor conduit into the path of the primary reactant stream to cause said reactants to flow in the same direction, maintaining the relative velocities of said reactants at a level which leads to the formation of a wake around each secondary reactant conduit and prevents flashback of the reaction to any point upstream of the secondary reactant conduit, allowing the reactants to contact each other under conditions which permit reaction for producing particulate solid product to occur downstream and remote from the secondary reactant inlets, whereby buildup of product at the reactant inlets is prevented or avoided.

2. The process of claim 1 wherein the secondary reactant is introduced into said reactor through a conduit extending into the reactor in a direction perpendicular to the direction of primary reactant flow.

3. The process of claim 2 wherein the inlet for the secondary reactant is a slot located axially along the length and on the downstream side of the conduit.

4. The process of claim 2 wherein the wake is a length greater than the diameter of one secondary reactant conduit.

5. The process of claim 1 wherein the primary reactant is selected from the group consisting of oxygen and ammonia.

6. The process of claim 1 wherein the secondary reactant is selected from the group consisting of vaporous metals and metal salts.

7. The process of claim 6 wherein the primary reactant is selected from the group consisting of oxygen and ammonia.

* * * * *